Figure 1:
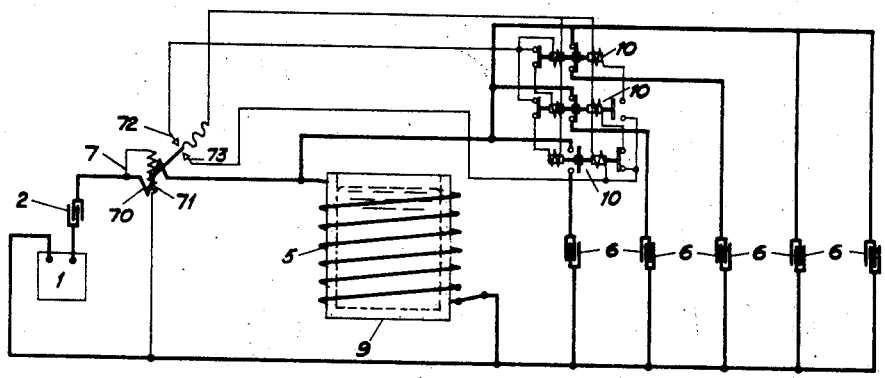

Feb. 16, 1932.  L. DREYFUS  1,845,910

REGULATING MEANS FOR ELECTRIC INDUCTION FURNACES

Filed Oct. 11, 1930

Inventor.
Ludwig Dreyfus.
per Wm Wallace White
Attorney.

Patented Feb. 16, 1932

1,845,910

UNITED STATES PATENT OFFICE

LUDWIG DREYFUS, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN

REGULATING MEANS FOR ELECTRIC INDUCTION FURNACES

Application filed October 11, 1930, Serial No. 488,029, and in Sweden April 23, 1929.

All electric induction furnaces and particularly those having no closed ferromagnetic circuit (which usually are operated with a higher frequency than that normally used for energy purposes and therefore frequently are referred to as high frequency furnaces) operate with a high magnetic leakage and therefore consume a high reactive power besides the active power converted into heat. It is therefore general practice to connect a condenser battery in parallel to the furnace, and it has also been proposed to regulate the reactive power delivered by said battery in proportion to that consumed by the furnace or vice versa so that the generator need only supply the active power.

It has now been found, that such a regulation is very difficult to accomplish if the reactance of the generator is not first compensated by a condenser. The reason herefore is that the reactive power demand of the furnace in many cases varies very rapidly and irregularly, particularly in the melting of iron. As long as the permeability of the iron is still high during the heating, the furnace may be regarded as an inductance coil with a core consisting of the charge of the furnace. If the said charge consists of small scrap iron, its magnetic properties will even approach those of a laminated iron core, although with large air gaps in the flux path. When the iron has passed its critical point of magnetic transformation, the furnace in its magnetic properties is more like an inductance coil without an iron core, that is, it has a much lower inductance than before. The transformation frequently occurs in repeated, sudden steps, as fresh pieces of the charge pass the critical point. In melting other metals than iron the variation will not be so large but still distinctly pronounced. In such case they depend on the fact that the material before melting is more or less finely disintegrated, so that the skin effect is less pronounced than in the molten bath, in spite of the lower specific resistance. The skin effect, as is well known, involves a concentration of the magnetic flux towards the surface of the conductor, that is, of the furnace contents, and this concentration will therefore be stronger before than after the melting of a finely disintegrated material. In melting solid pieces, the result may be the contrary. At any rate, the reactive power demand varies irregularly.

If the current generating machine has a large reactance, the voltage on the furnace will vary strongly with the reactive power demand. A mutual regulation of the demand and supply of reactive power can be accomplished in the best way if the voltage on the furnace and on the condenser battery is approximately constant. This is particularly the case if such regulation shall be made in an automatic manner.

According to the present invention, in such furnaces which are capable of regulation with respect to condensers in parallel therewith so as to make the resulting reactive power demand equal to zero, a series condenser is connected in a common conductor from the generator to the furnace and condenser battery and dimensioned so as to compensate essentially the inductive voltage drop in the circuit in question, which mainly occurs in the machine.

Figure 2:
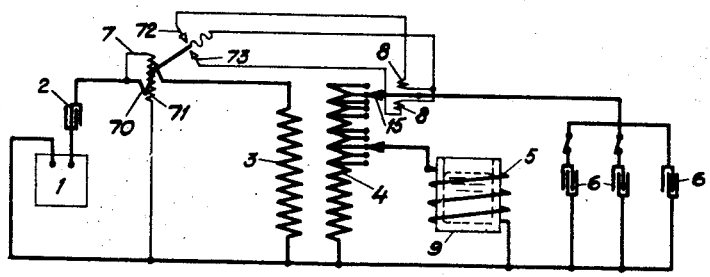
Figure 3:
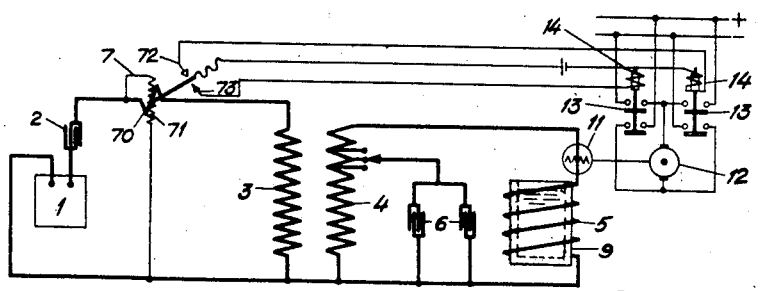

The invention is diagrammatically illustrated in the accompanying drawings, in which Figs. 1, 2 and 3 show it in different applications.

Referring to Fig. 1, 1 is the high frequency generator and 2 the condenser connected in series therewith, said condenser being preferably capable of some regulation and serving to compensate the inductive voltage drop in the generator so that the resultant voltage will be substantially constant at all loads. The generator feeds the primary winding 5 of an induction furnace 9, said winding having adjustable taps for permitting a regulation. In parallel with the primary winding 5, there is connected a battery of condensers 6, of which a portion can be cut out by means of a regulating apparatus shown as contactors 10 actuated over a master relay 7. This relay is of the reactive power type, having its current coil 70 connected in the lead between the machine 1 and the winding 5 and condenser battery in parallel, while its voltage coil 71 is connected across the terminals of the winding 5 in a highly inductive or condensive circuit, so that the relay will respond substantially only to the reactive power. It has two contacts, 72, 73, one for an excess of inductive power flowing from the machine and the other for an excess of capacitive power flowing from the machine. The closing of the former contact will cause the connection of more condensers in circuit, and the closing of the latter will cause the cutting out of condensers.

In the form shown in Fig. 2, the generator feeds the primary winding 3 of a transformer, the seondary winding 4 of which has taps to which the primary winding 5 of the furnace 9 and the condenser battery 6 can be connected so that the voltage can be varied on either or both of these. A regulation of the capacitative current may also here be effected by connecting different numbers of condensers in parallel, for instance by hand.

The regulation of the voltage tapped from the secondary winding 4 may be effected automatically by means of a reactive power relay 7 of the same kind as that shown in Fig. 1, the contacts 72 and 73 of said relay here serving to energize coils 8 for operating a ratio adjuster 15.

In Fig. 3, the voltage on the furnace winding 5 is regulated by means of an induction regulator 11 connected between the secondary winding 4 of the transformer and the primary winding 5 of the furnace. The induction regulator can be operated by means of a motor 12 which is started in one direction or the other by means of relays 13, the coils 14 of which are energized over the contacts 72, 73 of a relay 7 in the same way as the contacts 8 in Fig. 2.

I claim as my invention:—

1. In electric induction furnaces, an alternating current generating machine, an induction coil fed thereby, a furnace receptacle adjacent to said induction coil and adapted to contain a metal charge acting as a secondary winding thereto, a condenser battery connected in parallel to said induction coil, means for varying the effective capacity of said condenser battery with respect to said induction coil, and a condenser inserted in the connection between said machine and said induction coil and condenser battery and adapted to compensate the inductive voltage drop in said machine.

2. In electric induction furnaces, an alternating current generating machine, an induction coil fed thereby, a furnace receptacle adjacent to said induction coil and adapted to contain a metal charge acting as a secondary winding thereto, a condenser battery connected in parallel to said induction coil, means for automatically varying the effective capacity of said condenser battery with respect to said induction coil to compensate each other, and a condenser inserted in the connection between said machine and said induction coil and condenser battery and adapted to compensate the inductive voltage drop in said machine.

3. In electric induction furnaces, an alternating current generating machine, an induction coil fed thereby, a furnace receptacle adjacent to said induction coil and adapted to contain a metal charge acting as a secondary winding thereto, a condensed battery connected in parallel to said induction coil, means, including a reactive power relay inserted in the connection between said machine and said induction coil and condenser battery, for automatically varying the effective capacity of said condenser battery with respect to said induction coil to compensate each other, and a condenser inserted in the connection between said machine and said induction coil and condenser battery and adapted to compensate the inductive voltage drop in said machine.

In testimony whereof I have signed my name to this specification.

LUDWIG DREYFUS.